(12) United States Patent
Nordenhake et al.

(10) Patent No.: US 8,279,185 B2
(45) Date of Patent: Oct. 2, 2012

(54) METHODS, DEVICES AND COMPUTER PROGRAM PRODUCTS FOR POSITIONING ICONS ON A TOUCH SENSITIVE SCREEN

(75) Inventors: Magnus Nordenhake, Malmö (SE); Eral Foxenland, Malmö (SE); Anna Jakobsson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 654 days.

(21) Appl. No.: 12/437,783

(22) Filed: May 8, 2009

(65) Prior Publication Data

US 2010/0283744 A1 Nov. 11, 2010

(51) Int. Cl.
*G06F 3/041* (2006.01)
(52) U.S. Cl. ........................................................ 345/173
(58) Field of Classification Search ........... 345/173–183
See application file for complete search history.

(56) References Cited

U.S. PATENT DOCUMENTS

| 2002/0080123 | A1 | 6/2002 | Kennedy |
| 2005/0237310 | A1 | 10/2005 | Fabritius |
| 2009/0073132 | A1* | 3/2009 | Lee et al. ............... 345/173 |

FOREIGN PATENT DOCUMENTS

| EP | 2 045 700 A1 | 4/2009 |
| EP | 2 146 271 A2 | 1/2010 |
| EP | 2 199 893 A2 | 6/2010 |
| WO | WO 2004/063862 A2 | 7/2004 |

OTHER PUBLICATIONS

International Search Report and The Written Opinion for PCT/IB2009/055009 mailed on Nov. 5, 2010.

* cited by examiner

*Primary Examiner* — Kevin M Nguyen
(74) *Attorney, Agent, or Firm* — Myers Bigel Sibley & Sajovec

(57) ABSTRACT

Methods, systems and computer program products for positioning a plurality of icons on a touch sensitive screen include receiving an input to the touch sensitive screen including a substantially continuous stroke between a first and a second position on the screen. The plurality of icons is positioned on the touch sensitive screen responsive to the substantially continuous stroke.

20 Claims, 6 Drawing Sheets

METHODS, DEVICES AND COMPUTER PROGRAM PRODUCTS FOR POSITIONING ICONS ON A TOUCH SENSITIVE SCREEN

FIELD OF THE INVENTION

The present invention relates to touch sensitive screens, and in particular to relocating icons on a touch sensitive screen.

BACKGROUND

Icons are typically arranged on a desktop computer screen by either a computer generated default arrangement, such as in columns and rows, or by allowing a user to select individual icons and drag the icons to a location on the screen. This process can be cumbersome and time consuming, especially if the size of the screen is small such as in a hand-held device.

SUMMARY OF EMBODIMENTS OF THE INVENTION

Methods for positioning a plurality of icons on a touch sensitive screen include receiving an input to the touch sensitive screen including a substantially continuous stroke between a first and a second position on the screen. The plurality of icons is positioned on the touch sensitive screen responsive to the substantially continuous stroke.

In some embodiments, the substantially continuous stroke comprises an arch and the plurality of icons is relocated in a spaced-apart configuration generally defined by the arch. The spaced-apart configuration of the icons generally defined by the arch can be configured to increase ergonomics of the touch sensitive screen. The touch sensitive screen can be mounted on a hand-held device.

In some embodiments, an area size associated with the input to the touch sensitive screen is detected, and the plurality of icons is sized and/or positioned responsive to the area size associated with the input. The area size can include an input area size of a thumb of a user. The sizing and/or positioning the plurality of icons can include increasing a size of the plurality of icons if the input area size is greater than a threshold amount, and decreasing a size of the plurality of icons if the input area size is less than a threshold amount. The sizing and/or positioning the plurality of icons can include increasing a spacing between the plurality of icons if the input size area is greater than a threshold amount; and decreasing a spacing between the plurality of icons if the input size area is less than a threshold amount.

In some embodiments, the substantially continuous stroke includes a rectangle and/or oval shape and the plurality of icons are positioned in a spaced-apart configuration generally defined by the rectangle and/or oval shape.

Devices for positioning a plurality of icons on a touch sensitive screen include a touch sensitive screen configured to receive an input including a substantially continuous stroke between a first and a second position on the screen. An icon positioning module positions the plurality of icons on the touch sensitive screen responsive to the substantially continuous stroke.

In some embodiments, the substantially continuous stroke includes an arch and the plurality of icons is relocated in a spaced-apart configuration generally defined by the arch. The spaced-apart configuration of the icons generally defined by the arch can be configured to increase ergonomics of the touch sensitive screen. The device can be a hand-held device, and the touch sensitive screen can be mounted on the hand-held device.

In some embodiments, an area size associated with the input to the touch sensitive screen is detected, and the icon positioning module is configured to size and/or position the plurality of icons responsive to the area size associated with the input. In some embodiments, the icon positioning module is configured to size and/or position the plurality of icons by increasing a size of the plurality of icons if the input area size is greater than a threshold amount, and decreasing a size of the plurality of icons if the input area size is less than a threshold amount. In some embodiments, the icon positioning module is configured to size and/or position the plurality of icons by increasing a spacing between the plurality of icons if the input size area is greater than a threshold amount; and decreasing a spacing between the plurality of icons if the input size area is less than a threshold amount.

In some embodiments, the substantially continuous stroke includes a rectangle and/or oval shape and the plurality of icons are positioned in a spaced-apart configuration generally defined by the rectangle and/or oval shape.

According to some embodiments of the invention, a computer program product for positioning icons on a touch sensitive screen is provided. The computer program product includes a computer readable storage medium having computer readable program code embodied in the medium. The computer readable program code includes computer readable program code configured to receive an input to the touch sensitive screen including a substantially continuous stroke between a first and a second position on the screen. Computer readable program code is further configured to position the plurality of icons on the touch sensitive screen responsive to the substantially continuous stroke.

In some embodiments, the substantially continuous stroke comprises an arch and the plurality of icons is positioned in a spaced-apart configuration generally defined by the arch. The spaced-apart configuration of the icons generally defined by the arch can be configured to increase ergonomics of the touch sensitive screen. The touch sensitive screen can be mounted on a hand-held device.

BRIEF DESCRIPTION OF THE DRAWINGS

The accompanying drawings, which are incorporated in and constitute a part of the specification, illustrate embodiments of the invention and, together with the description, serve to explain principles of the invention.

DETAILED DESCRIPTION OF EMBODIMENTS OF THE INVENTION

Figures 1A, 1B:
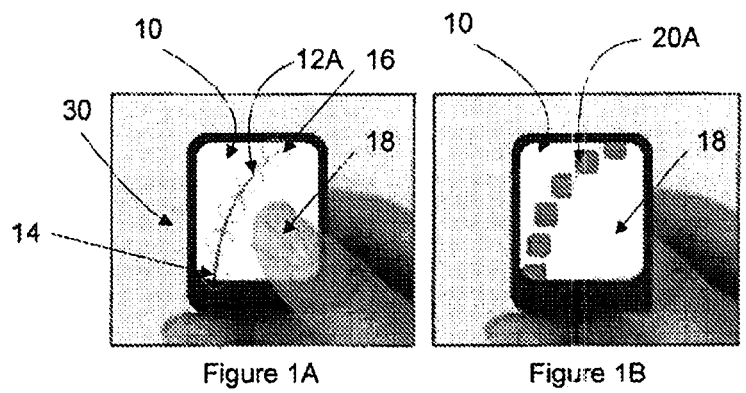
FIGS. 1A-1B are a schematic illustrations of a hand-held device having a touch sensitive screen illustrating a substantially continuous stroke input (FIG. 1A) and a resulting icon configuration (FIG. 1B) according to some embodiments of the present invention.

The present invention now will be described hereinafter with reference to the accompanying drawings and examples, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under." The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present invention. The sequence of operations (or steps) is not limited to the order presented in the claims or figures unless specifically indicated otherwise.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. Specific examples (a non-exhaustive list) of the computer-readable medium would include the following: a portable computer diskette, a random access memory (RAM), a read-only memory (ROM), an erasable programmable read-only memory (EPROM or Flash memory), and a portable compact disc read-only memory (CD-ROM).

As shown in FIGS. 1A-1B, a touch sensitive screen 10 is mounted on a hand-held device 30. The hand-held device 30 can be a mobile communications terminal or mobile terminal. As used herein, a "mobile communications terminal" or "mobile terminal" includes, but is not limited to, a terminal that is configured to receive communication signals via a wireless interface from, for example, a cellular network, a Wide Area Network, wireless local area network (WLAN), and/or another RF communication device. Example mobile terminals include, but are not limited to, a cellular mobile terminal; a personal communication terminal that may combine a cellular mobile terminal with data processing, facsimile and data communications capabilities; a personal data assistance (PDA) that can include a wireless receiver, pager, Internet/intranet access, local area network interface, wide area network interface, Web browser, organizer, and/or calendar; and a mobile or fixed computer or other device that includes a wireless receiver. In some embodiments, the device can be held in one hand by a user.

As shown in FIG. 1A, the touch sensitive screen 10 is configured to receive input from an input mechanism or thumb 18. The touch sensitive screen 10 receives a substantially continuous stroke input 12A between a first position 14 and a second position 16. As shown in FIG. 1B, the hand-held device 30 automatically positions a plurality of icons 20A on the touch sensitive screen 10 responsive to the substantially continuous stroke 12A. The stroke 12A can follow a continuous arcuate path such that the thumb 18 maintains contact with the screen 10 through the stroke 12A. For example, as shown in FIGS. 1A-1B, the input to the touch sensitive screen follows a substantially continuous arch or input 12A, and the plurality of icons 20A are positioned in a spaced-apart configuration generally defined by the arch input 12A.

In this configuration, the user can quickly personalize a menu view of icons without requiring input or handler buttons on the screen 10, which can reduce the number of graphics on the screen 10 and free the screen space of other uses. The continuous stroke input 12A can be entered by a user using a single hand while the same hand holds the device. Moreover, the shape of the input 12A can generally conform to a natural ergonomic stroke such that the icons 20A are automatically ergonomically arranged on the touch sensitive screen 10. The icons 20A can be arranged responsive to the input 12A so as to conform to a right-handed or left-handed configuration personalized for the user. The icons 20A can be icons representing applications, files, links and the like.

Figures 2A, 2B:
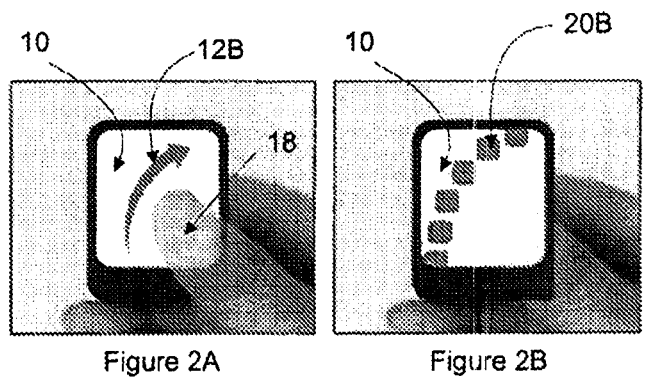
FIGS. 2A-2B are a schematic illustrations of a hand-held device having a touch sensitive screen illustrating a substantially continuous arch stroke input (FIG. 2A) and a resulting icon configuration (FIG. 2B) according to some embodiments of the present invention.
Figures 3A, 3B:
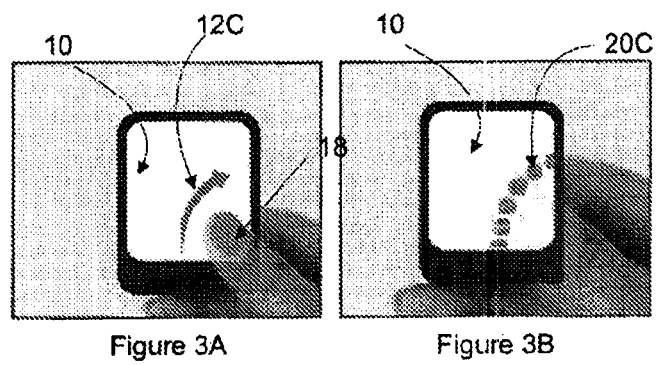
FIGS. 3A-3B are a schematic illustrations of a hand-held device having a touch sensitive screen illustrating a substantially continuous relatively small stroke input (FIG. 3A) and a resulting icon configuration (FIG. 3B) according to some embodiments of the present invention.

In some embodiments, a continuous stroke input can be used to further define a size, spacing, and/or location of the icons. For example, an area size associated with the input can be detected, and the icons can be sized and/or positioned on the screen 10 responsive to the area size. As shown in FIGS. 2A-2B, the thumb 18 is relatively large and results in a large generally continuous stroke input 12B having a relatively large thickness. The touch sensitive screen 10 detects the thickness of the continuous stroke input 12B and positions the icons 20B on the touch sensitive screen 10 in FIG. 2B such that the icons 20B are relatively large and spaced apart. As shown in FIGS. 3A-3B, the thumb 18 is relatively small and results in a relatively small generally continuous stroke input 12C having a smaller thickness than the input 12B. The touch sensitive screen 10 positions the icons 20C in a smaller arch than in FIG. 2B accordingly. In addition, the touch sensitive screen 10 can decrease the size of the icons 20C in accordance with the size of the input thumb 18. In particular embodiments, the size of the icons 20B, 20C is increased (e.g., from a standard size) if the input area size is greater than a threshold amount, and the size of the icons 20B, 20C is decreased if the input area size is less than a threshold amount. In addition, the spacing between the icons 20B, 20C can be increased (e.g., from a standard spacing) if the input size area is greater than a threshold amount, the spacing between the icons 20B, 20C can be decreased if the input size area is less than a threshold amount.

Figures 4A, 4B:
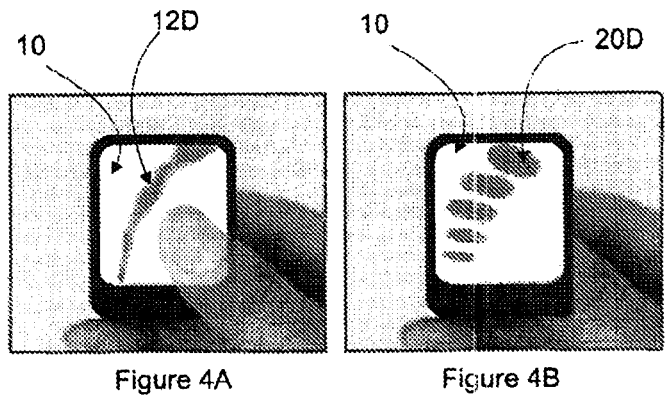
FIGS. 4A-4B are a schematic illustrations of a hand-held device having a touch sensitive screen illustrating a substantially continuous, variable thickness stroke input (FIG. 4A) and a resulting icon configuration with icons sized responsive to the change in thickness of the stroke input (FIG. 4B) according to some embodiments of the present invention.

In addition, the size of the icons may be uniform as shown in FIGS. 2B and 3B. However, as illustrated in FIGS. 4A-4B, the continuous stroke input 12D may have a variable thickness. The touch sensitive screen 10 can generate icon 20D that vary in size in accordance with the thickness of the continuous stroke input 12D.

Figure 5A:
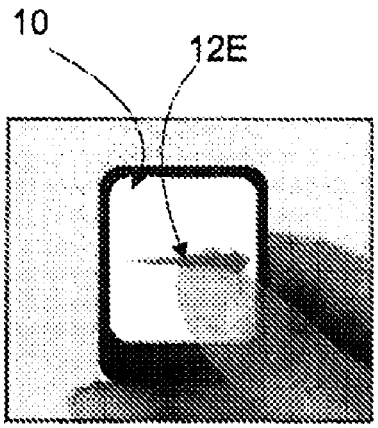
FIGS. 5A-5B are a schematic illustrations of a hand-held device having a touch sensitive screen illustrating a substantially continuous horizontal stroke input (FIG. 5A) and a resulting icon configuration (FIG. 5B) according to some embodiments of the present invention.
Figure 5B:
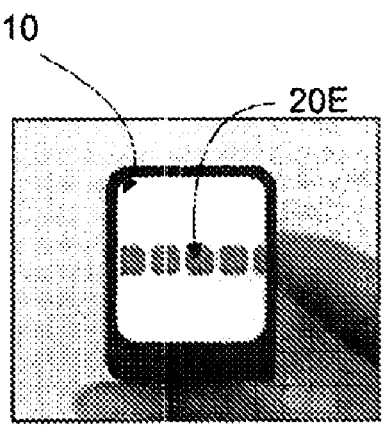
Figure 6A:
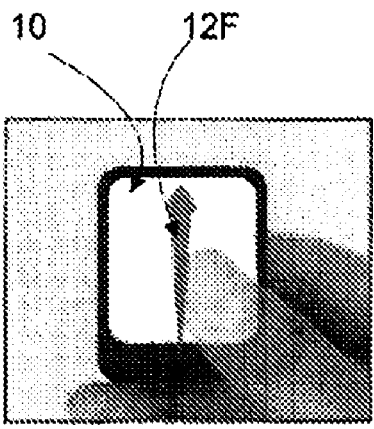
FIGS. 6A-6B are a schematic illustrations of a hand-held device having a touch sensitive screen illustrating a substantially continuous vertical stroke input (FIG. 6A) and a resulting icon configuration (FIG. 6B) according to some embodiments of the present invention.
Figure 6B:
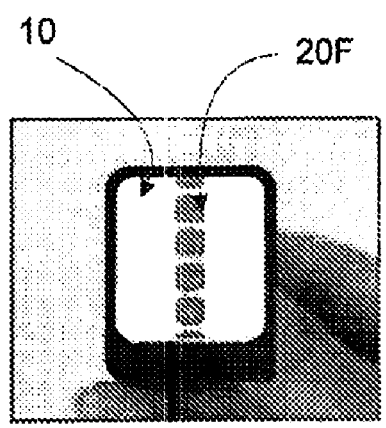
Figure 7A:
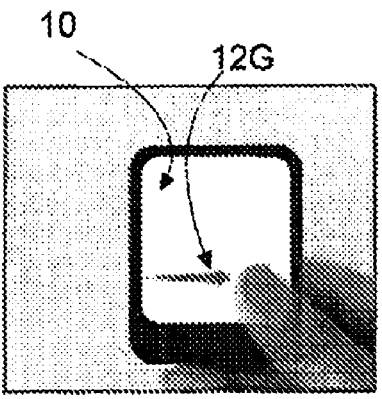
FIGS. 7A-7B are a schematic illustrations of a hand-held device having a touch sensitive screen illustrating a substantially continuous, offset horizontal stroke input (FIG. 7A) and a resulting icon configuration (FIG. 7B) according to some embodiments of the present invention.
Figure 7B:
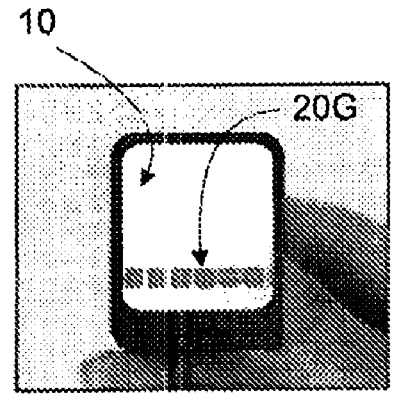

Although various touch sensitive inputs, such as continuous stroke inputs 12A-12D in FIGS. 1A, 2A, 3A and 4A, are illustrated with respect to arch shaped inputs 12A-12D, other configurations can be used. For example, as shown in FIGS. 5A-5B, the input 12E can be a generally horizontal line corresponding to horizontally spaced apart icons 20E. As shown in FIGS. 6A-6B, the input 12F can be a generally vertical line, which results in a generally vertical spaced apart arrangement of the icons 20F. The icons can be arranged in the center of the screen 10, or as illustrated in FIGS. 7A-7B, the icons 20G can be offset (in this case below the center of the screen 10) based on the location of the input 12G.

Figure 8A:
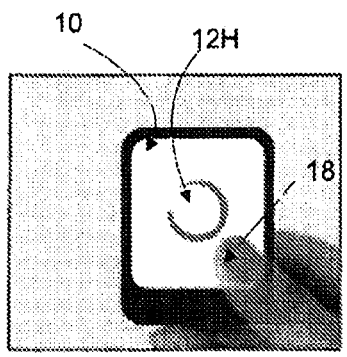
FIGS. 8A-8B are a schematic illustrations of a hand-held device having a touch sensitive screen illustrating a substantially continuous, relatively small, circular stroke input (FIG. 8A) and a resulting circular icon configuration (FIG. 8B) according to some embodiments of the present invention.
Figure 8B:
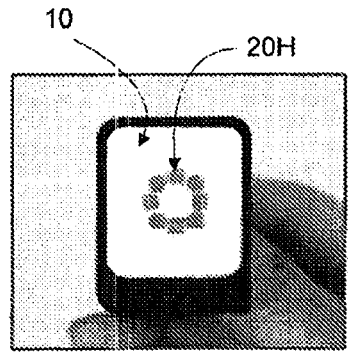
Figure 9A:
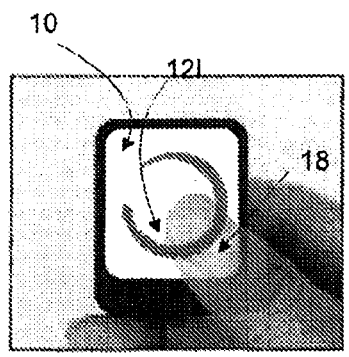
FIGS. 9A-9B are a schematic illustrations of a hand-held device having a touch sensitive screen illustrating a substantially continuous, relatively large, circular stroke input (FIG. 9A) and a resulting circular icon configuration (FIG. 9B) according to some embodiments of the present invention.
Figure 9B:
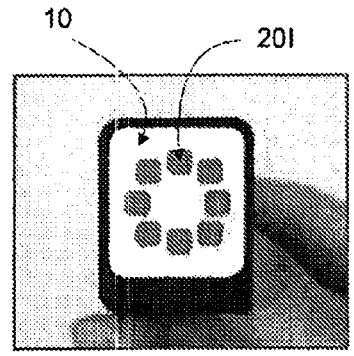

Other configurations of generally continuous stroke inputs can be used to define other icon configurations. For example, as illustrated in FIGS. 8A-8B, a relatively small circular input 12H can be used to arrange the icons 20H in a small circular configuration. As illustrated in FIGS. 9A-9B, a relatively large circular input 12I can be used to arrange the icons 20I in a larger or circular configuration. In some embodiments, the icons 20I may be larger than the icons 20H based either on the relative sizes of the circular inputs 12H and 12I and/or on the area size of the thumbs 18.

Figure 10A:
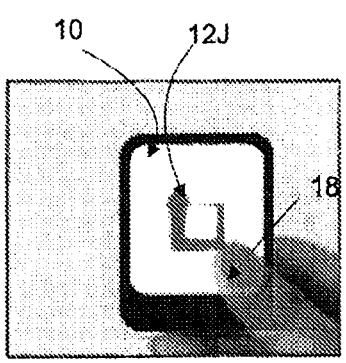
FIGS. 10A-10B are a schematic illustrations of a hand-held device having a touch sensitive screen illustrating a substantially continuous, relatively small, rectangular stroke input (FIG. 10A) and a resulting rectangular icon configuration (FIG. 10B) according to some embodiments of the present invention.
Figure 10B:
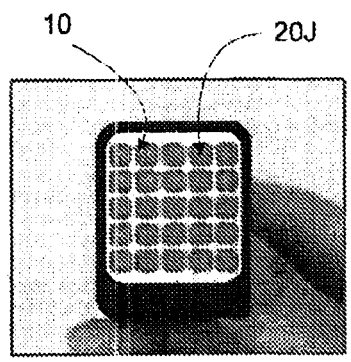
Figure 11A:
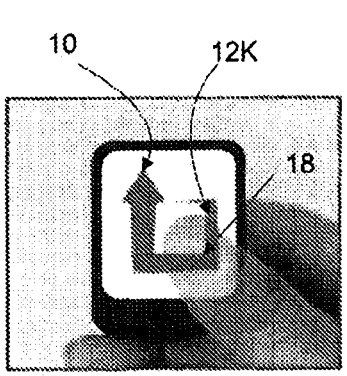
FIGS. 11A-11B are a schematic illustrations of a hand-held device having a touch sensitive screen illustrating a substantially continuous, relatively large, rectangular stroke input (FIG. 11A) and a resulting rectangular icon configuration (FIG. 11B) according to some embodiments of the present invention.
Figure 11B:
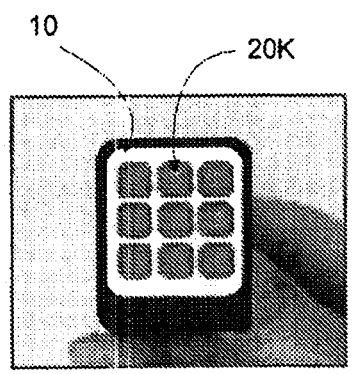

As shown in FIGS. 10A-10B, a relatively small generally rectangular or square input 12J can be used to define a grid of the icons 20J. As shown in FIGS. 11A-11B, a relatively large generally rectangular or square input 12K can be used to define a another grid of the icons 20K. The icons 20J are smaller than the icons 20K based on the relative sizes of the inputs 12J and 12K and/or the thumbs 18.

Figure 12:
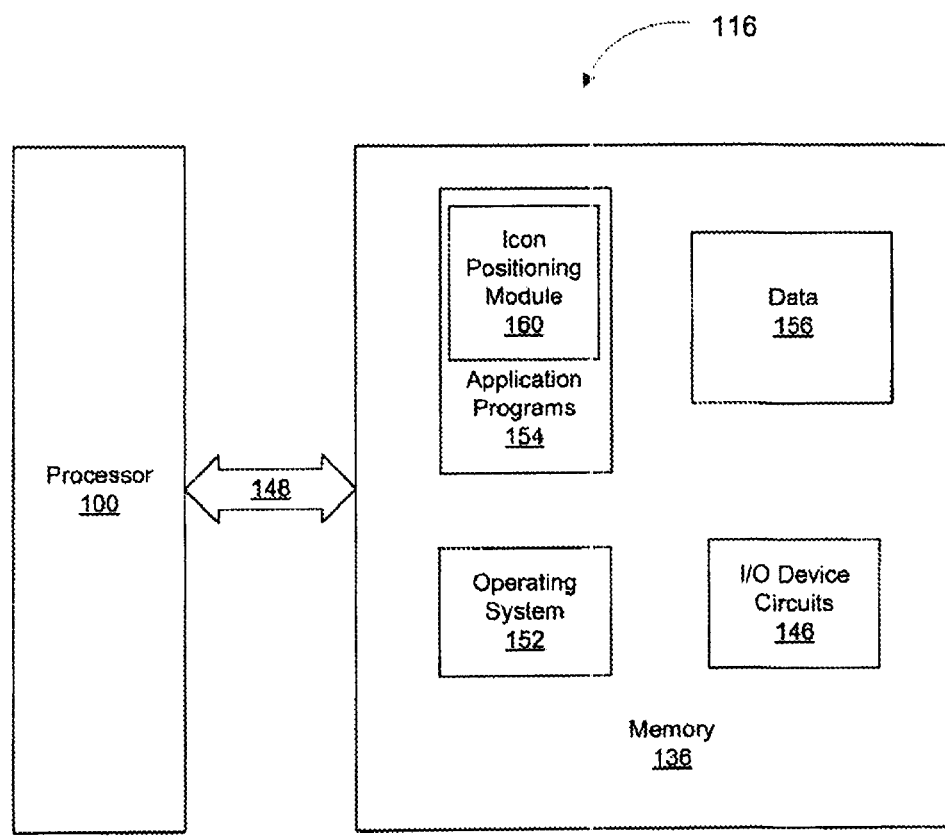
FIG. 12 is a schematic illustration of a computer processing system according to some embodiments of the present invention.

FIG. 12 illustrates an exemplary data processing system that may be included in a wireless terminal operating in accordance with some embodiments of the present invention. As illustrated in FIG. 12, a data processing system 116, which can be used to carry out or direct operations includes a processor 100, a memory 136 and input/output circuits 146. The data processing system 116 may be incorporated in a portable wireless terminal or other device having a touch sensitive screen that communicates inputs via the I/O device circuits 146. The processor 100 communicates with the memory 136 via an address/data bus 148 and communicates with the input/output circuits 146 via an address/data bus 149. The input/output circuits 146 can be used to transfer information between the memory (memory and/or storage media) 236 and another component, such as a touch sensitive screen. These components may be conventional components such as those used in many conventional data processing systems, which may be configured to operate as described herein.

In particular, the processor 100 can be a commercially available or custom microprocessor, microcontroller, digital signal processor or the like. The memory 136 may include any memory devices and/or storage media containing the software and data used to implement the functionality circuits or modules used in accordance with embodiments of the present invention. The memory 136 can include, but is not limited to, the following types of devices: cache, ROM, PROM, EPROM, EEPROM, flash memory, SRAM, DRAM and magnetic disk. In some embodiments of the present invention, the memory 136 may be a content addressable memory (CAM).

As further illustrated in FIG. 12, the memory (and/or storage media) 136 may include several categories of software and data used in the data processing system: an operating system 152; application programs 154; input/output device circuits 146; and data 156. The input/output device circuits 146 typically include software routines accessed through the operating system 152 by the application program 154 to communicate with various devices such as the touch sensitive screen. The application programs 154 are illustrative of the programs that implement the various features of the circuits and modules according to some embodiments of the present invention. The data 156 represents the static and dynamic data used by the application programs 154, the operating system 152, the input/output device circuits 146 and other software programs that may reside in the memory 136.

The data processing system 116 may include several modules, including an icon positioning module 160. The modules may be configured as a single module or additional modules otherwise configured to implement the operations described herein for positioning and/or sizing icons on a screen. The data 156 can include input data from a touch sensitive screen.

While the present invention is illustrated with reference to the icon positioning module 160 in FIG. 12, as will be appreciated by those of skill in the art, other configurations fall within the scope of the present invention. For example, rather than being an application program 154, these circuits and modules may also be incorporated into the operating system 152 or other such logical division of the data processing system. Furthermore, while the icon positioning module 160 in FIG. 1 is illustrated in a single data processing system, as will be appreciated by those of skill in the art, such functionality may be distributed across one or more data processing systems. Thus, the present invention should not be construed as limited to the configurations illustrated in FIG. 1, but may be provided by other arrangements and/or divisions of functions between data processing systems. For example, although FIG. 12 is illustrated as having various circuits and modules, one or more of these circuits or modules may be combined, or separated further, without departing from the scope of the present invention.

Figure 13:
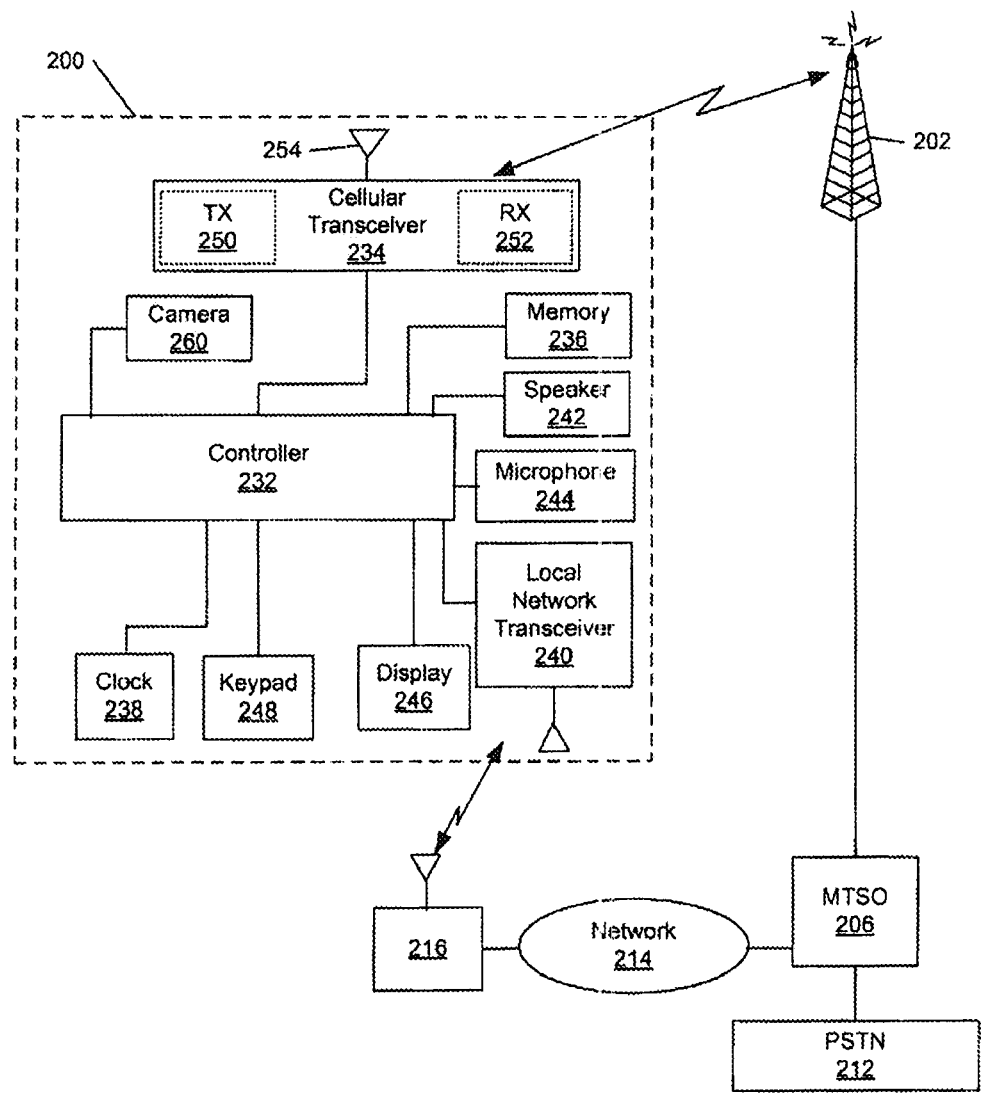
FIG. 13 is a schematic illustration of a telecommunications network and a portable communications device according to some embodiments of the present invention.

FIG. 13 is a schematic block diagram of a wireless communication system that includes a wireless terminal 200, such as a mobile wireless communications terminal, that receives wireless communication signals from a cellular base station 202 and/or a wireless local network 216. The cellular base station 202 is connected to a MTSO 206, which, in turn, is connected to a PSTN 212, and a network 214 (e.g., Internet). The mobile terminal 200 may communicate with the wireless local network 216 using a communication protocol that may include, but is not limited to, 802.11a, 802.11b, 802.11e, 802.11g, 802.11i, and/or other wireless local area network protocols. The wireless local network 216 may be connected to the network 214.

In some embodiments of the invention, the mobile terminal 200 includes various components, such as a camera 260, a controller 232, a cellular transceiver 234, a memory 236, a timing circuit (clock) 238, a local network transceiver 240, a speaker 242, a microphone 244, a display 246 and a keypad 248. The display 246 can be a touch sensitive display or screen, such as the touch sensitive display 10 shown in FIGS. 1-11.

The memory 236 stores software (e.g., as described in FIG. 12) that is executed by the controller 232, and may include one or more erasable programmable read-only memories (EPROM or Flash EPROM), battery backed random access memory (RAM), magnetic, optical, or other digital storage device, and may be separate from, or at least partially within, the controller 232. The controller 232 may include more than one processor, such as, for example, a general purpose processor and a digital signal processor, which may be enclosed in a common package or separate and apart from one another.

In particular, the controller 232 may be configured to control various functions of the wireless terminal 200, including receiving input from a touch sensitive screen (e.g., display 246) and positioning the icons on the screen as described herein.

As shown in FIG. 13, the cellular transceiver 234 typically includes both a transmitter (TX) 250 and a receiver (RX) 252 to allow two way communications, but the present invention is not limited to such devices and, as used herein, a "transceiver" may include only the receiver 252. The mobile terminal 200 may thereby communicate with the base station 202 using radio frequency signals, which may be communicated through an antenna 254. For example, the mobile terminal 200 may be configured to communicate via the cellular transceiver 234 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Communication protocols as used herein may specify the information communicated, the timing, the frequency, the modulation, and/or the operations for setting-up and/or maintaining a communication connection. In some embodiments, the antennas 228 and 254 may be a single antenna.

Embodiments of the present invention will now be described with reference to FIG. 14, which is a flowchart illustration of operations, which may be at least partially carried out on the controller 232 and/or the icon positioning module 160, according to embodiments of the present invention.

Figure 14:
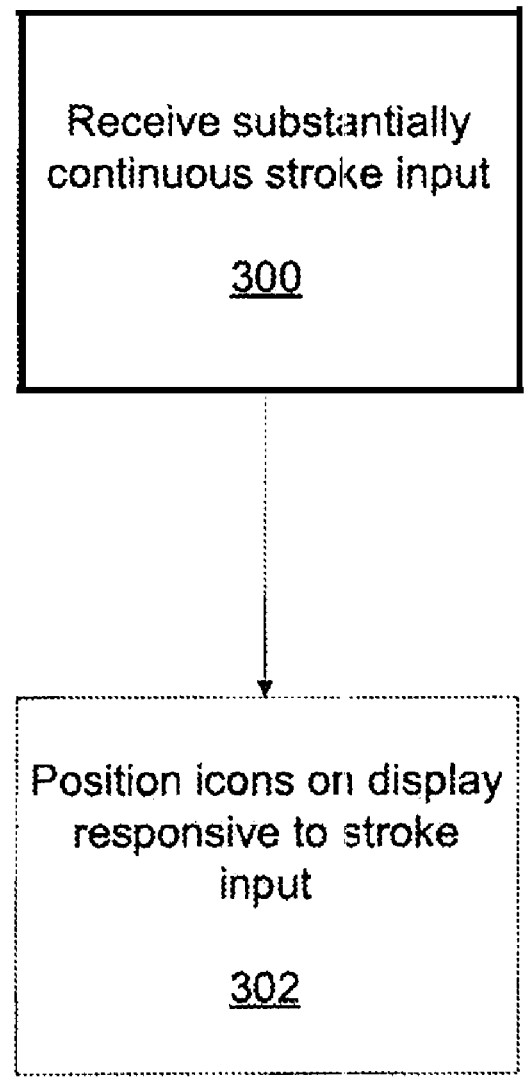
FIG. 14 is a flowchart illustrating operations according to some embodiments of the present invention.

As shown in FIG. 14, an input is received by the touch sensitive screen (Block 300). The input can be a substantially continuous stroke between two different positions on the screen as described herein. A plurality of icons are positioned on the touch sensitive screen responsive to the substantially continuous stroke (Block 302). Accordingly, the user can quickly personalize a viewing configuration of icons without requiring input or handler buttons on the screen. The shape of the continuous stroke input can be used to determine the positions of the icons and/or the size of the icons, and can be used to generally conform the icon configuration to a natural ergonomic touch screen stroke that is personalized to the user.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for relocating a plurality of icons on a touch sensitive screen, the method comprising:
   receiving an input to the touch sensitive screen comprising a substantially continuous stroke between a first and a second position on the screen, the substantially continuous stroke defining a shape on the screen; and
   positioning the plurality of icons on the touch sensitive screen in a spaced-apart configuration generally along the shape defined by the substantially continuous stroke on the screen and responsive to the substantially continuous stroke.

2. The method of claim 1, wherein the substantially continuous stroke comprises an arch and the plurality of icons is positioned in a spaced-apart configuration generally defined by the arch.

3. The method of claim 2, wherein the spaced-apart configuration of the icons generally defined by the arch is configured to increase ergonomics of the touch sensitive screen.

4. The method of claim 3, wherein the touch sensitive screen is mounted on a hand-held device.

5. The method of claim 1, further comprising:
   detecting an area size associated with the input to the touch sensitive screen; and
   sizing and/or positioning the plurality of icons responsive to the area size associated with the input.

6. The method of claim 5, wherein the area size comprises an input area size of a thumb of a user, and sizing and/or positioning the plurality of icons further comprises:
   increasing a size of the plurality of icons if the input area size is greater than a threshold amount; and
   decreasing a size of the plurality of icons if the input area size is less than a threshold amount.

7. The method of claim 5, wherein the area size comprises an input area size of a thumb of a user, and sizing and/or positioning the plurality of icons further comprises:
   increasing a spacing between the plurality of icons if the input size area is greater than a threshold amount; and
   decreasing a spacing between the plurality of icons if the input size area is less than a threshold amount.

8. The method of claim 1, wherein the substantially continuous stroke comprises a rectangle and/or oval shape and the plurality of icons are positioned in a spaced-apart configuration generally defined by the rectangle and/or oval shape.

9. A device for relocating a plurality of icons on a touch sensitive screen, the device comprising:
   a touch sensitive screen configured to receive an input comprising a substantially continuous stroke between a first and a second position on the screen, the substantially continuous stroke defining a shape on the screen; and
   an icon positioning module configured to position the plurality of icons on the touch sensitive screen in a spaced-apart configuration generally along the shape defined by the substantially continuous stroke on the screen and responsive to the substantially continuous stroke.

10. The device of claim 9, wherein the substantially continuous stroke comprises an arch and the plurality of icons is positioned in a spaced-apart configuration generally defined by the arch.

11. The device of claim 10, wherein the spaced-apart configuration of the icons generally defined by the arch is configured to increase ergonomics of the touch sensitive screen.

12. The device of claim 11, wherein the device comprises a hand-held device and the touch sensitive screen is mounted on the hand-held device.

13. The device of claim 9, wherein the icon positioning module is configured to detect an area size associated with the input to the touch sensitive screen and to size and/or position the plurality of icons responsive to the area size associated with the input.

14. The device of claim 13, wherein the area size comprises an input area size of a thumb of a user, and the icon positioning module is configured to size and/or position the plurality of icons by increasing a size of the plurality of icons if the input area size is greater than a threshold amount, and decreasing a size of the plurality of icons if the input area size is less than a threshold amount.

15. The device of claim 13, wherein the area size comprises an input area size of a thumb of a user, and the icon positioning module is configured to size and/or position the plurality of icons by increasing a spacing between the plurality of icons if the input size area is greater than a threshold amount, and decreasing a spacing between the plurality of icons if the input size area is less than a threshold amount.

16. The device of claim 9, wherein the substantially continuous stroke comprises a rectangle and/or oval shape and the plurality of icons are positioned in a spaced-apart configuration generally defined by the rectangle and/or oval shape.

17. A computer program product for positioning icons on a touch sensitive screen, the computer program product comprising:
   a non-transient computer readable storage medium having computer readable program code embodied in said medium, the computer readable program code comprising:
   computer readable program code configured to receive an input to the touch sensitive screen comprising a substantially continuous stroke between a first and a second position on the screen, the substantially continuous stroke defining a shape on the screen; and
   computer readable program code configured to position the plurality of icons on the touch sensitive screen in a spaced-apart configuration generally along the shape defined by the substantially continuous stroke on the screen and responsive to the substantially continuous stroke.

18. The computer program product of claim 17, wherein the substantially continuous stroke comprises an arch and the plurality of icons is positioned in a spaced-apart configuration generally defined by the arch.

19. The computer program product of claim 18, wherein the spaced-apart configuration of the icons generally defined by the arch is configured to increase ergonomics of the touch sensitive screen.

20. The computer program product of claim 19, wherein the touch sensitive screen is mounted on a hand-held device.

* * * * *